United States Patent [19]

Tabata et al.

[11] 4,173,410

[45] Nov. 6, 1979

[54] METHOD OF DUPLEX COPYING

[75] Inventors: Yasuhiro Tabata, Kawasaki; Toyokazu Satomi, Yokohama; Yutaka Koizumi, Kawasaki; Isao Nakamura, Tokyo; Tamaki Kaneko, Fujisawa, all of Japan

[73] Assignee: Ricoh Company, Ltd., Japan

[21] Appl. No.: 872,383

[22] Filed: Jan. 26, 1978

[30] Foreign Application Priority Data

Jan. 31, 1977 [JP] Japan .................................. 52/9480

[51] Int. Cl.[2] ...................... G03B 27/32; G03B 15/00; B65H 29/68

[52] U.S. Cl. ........................................ 355/24; 271/69; 355/3 SH

[58] Field of Search ................ 355/3 SH, 3 R, 14, 72, 355/75, 23-26; 271/3.1, 69

[56] References Cited

U.S. PATENT DOCUMENTS

| | | | |
|---|---|---|---|
| 1,452,996 | 4/1923 | Baker | 355/72 |
| 3,603,680 | 9/1971 | Barton | 355/3 R |
| 3,768,382 | 10/1973 | Zernov et al. | 271/69 X |
| 4,017,173 | 4/1977 | Komori et al. | 355/26 X |

FOREIGN PATENT DOCUMENTS

| | | | |
|---|---|---|---|
| 2203035 | 1/1973 | Fed. Rep. of Germany | 355/72 |
| 2616875 | 10/1976 | Fed. Rep. of Germany | 355/3 R |

*Primary Examiner*—Donald A. Griffin
*Attorney, Agent, or Firm*—McGlew and Tuttle

[57] ABSTRACT

In the method, two originals are placed side-by-side on the contact glass of an electrophotographic duplex copying machine and are scanned successively, in a single scanning operation, by the exposure optical system of the machine to form respective successive images on a photoconductive drum rotated past an image transfer device. Two transfer sheets are fed successively, with a short interval therebetween, from a primary supply device for transfer sheets, past the image transfer device in synchronism with the image formation on the drum, to provide duplex copies, having images in the same relation as that of the two originals, in a single copying cycle or process. By utilizing a secondary sheet supply device and a suitable switching device, images can be provided on both sides or surfaces of a transfer sheet or sheets. The duplex copying apparatus includes a novel sheet feed device effective to stack transfer sheets neatly.

8 Claims, 11 Drawing Figures

METHOD OF DUPLEX COPYING

BACKGROUND OF THE INVENTION

The present invention relates to a method of duplex copying by use of an electrophotographic duplex copying machine capable of forming images on both sides of each transfer sheet.

In the conventional method of duplex copying, as illustrated in FIG. 1, a sheet original or a bound material, such as a book, is placed on a contact glass 1 and a photoconductive drum 3 is exposed to a light image of the original by the scanning of an exposure optical system 2 so that a latent electrostatic image corresponding to the light image is formed on the photoconductive drum 3. The thus formed latent electrostatic image is then developed by a development apparatus 4 and the developed image is transferred to one side of a transfer sheet fed from a transfer sheet feed apparatus 5. After the transferred image is fixed to the transfer sheet by an image fixing apparatus 6, the sheet is stacked on a secondary transfer sheet feed apparatus 7, with the image-bearing side up.

Another original is then placed on the contact glass 1, and taking the same procedure as in the above-mentioned case, a latent electrostatic image is formed on the photoconductive drum 3 by the scanning of the exposure optical system 2. The transfer sheet which has had an image fixed on one side thereof, and which has been stacked on the secondary transfer sheet feed apparatus 7, is then fed from the apparatus 7 in such a manner that the other side thereof is brought into contact with the photoconductive drum 3. Thus, a toner image corresponding to an image of the second original is transferred to the back side of the above-mentioned transfer sheet and is discharged to a transfer sheet output tray 8 with its second side up after the transferred image has been fixed by the image fixing apparatus 6.

Thus, in the conventional method of duplex copying, two copying processes are required for one duplex copying.

Even in the case where a duplex copying machine having an auto document feeder for use with sheet originals is utilized, the same copying process has to be repeated two times, as in the above case, for forming images on both sides of each transfer sheet. One copying process means, in this specification, a copying process consisting of formation of a latent electrostatic image on a photoconductive drum by one scanning and exposure, development of the latent electrostatic image, transfer of the developed image to a transfer sheet after fixing of the developed image, and discharging of the image-bearing transfer sheet.

Recently speed-up of duplex copying is greatly demanded and, accordingly, various attempts have been made to develop a high speed duplex copying machine. However, a satisfactory duplex copying machine capable of making duplex copies speedily has not been developed.

Moreover, in duplex copying, transfer sheets having had images farmed on one side thereof have to be transported again to an image transfer station for duplex copying. In this case, it is important that such transfer sheets are stacked neatly and in good order. Otherwise, copying of other sides of the transfer sheets cannot be performed in a proper position of the respective transfer sheets. However, in the conventional duplex copying machine, neat stacking or lineup of such transfer sheets is not made.

SUMMARY OF THE INVENTION

It is therefore a primary object of the present invention to provide a duplex copying method which permits speed-up of duplex copying.

Another object of the invention is to provide a duplex copying method which permits a speedy duplex copying by reducing the number of copying processes.

A further object of the invention is to provide a method of duplex copying which permits the making of duplex copies having images in the same image-bearing relationship as that of originals to be copied.

A further object of the present invention is to provide a method of duplex copying by use of a duplex copying machine with an auto document feeder capable of making duplex copies from originals having images on both sides.

A still further object of the invention is to provide a sheet feed apparatus capable of stacking sheets neatly and in good order, which is particularly suitable for use in a duplex copying machine.

According to a method of duplex copying of the present invention, by a single exposure scanning of two originals placed on a contact glass side by side in the scanning direction of exposure means and by feeding two transfer sheets in synchronism with the above process, the respective images of the two originals are formed separately on the respective two transfer sheets. Thus, unlike the above-mentioned conventional method, two copying processes are not required in one duplex copying, but one duplex copying process is finished by a single exposure scanning. Accordingly, the duplex copying speed is significantly improved.

Also, according to the method of duplex copying of the present invention, duplex copies having images in the same image-bearing relationship as that of originals to be copied are obtained by use of a swingable guide member which determines the discharging direction of the two originals.

According to another method of duplex copying by use of an auto document feeder, particularly in the case where duplex copies are made from originals having images on both sides, two of such originals are fed in succession to a slit exposure station and by using a copying procedure similar to that in the above-mentioned case, the speed-up of duplex copying is attained.

Furthermore, in the present invention, a sheet feed apparatus is provided, and comprises a front plate and a side reference plate, both being fixedly exposed normal to each other, at least one movable plate disposed parallel to either the front plate or the side reference plate, and a base for stacking transfer sheets thereon, whereby the transfer sheets are brought into contact with both the front plate and the side reference plate so that the transfer sheets in a stack are lined up neatly. This apparatus can be utilized as a sheet original feed apparatus.

BRIEF DESCRIPTION OF THE DRAWINGS

For a better understanding of the invention as well as other objects and further features thereof, reference is had to the following detailed description of the invention to be read in connection with the accompanying drawings, wherein.

DETAILED DESCRIPTION OF THE PREFERRED EMBODIMENTS

Figure 1:
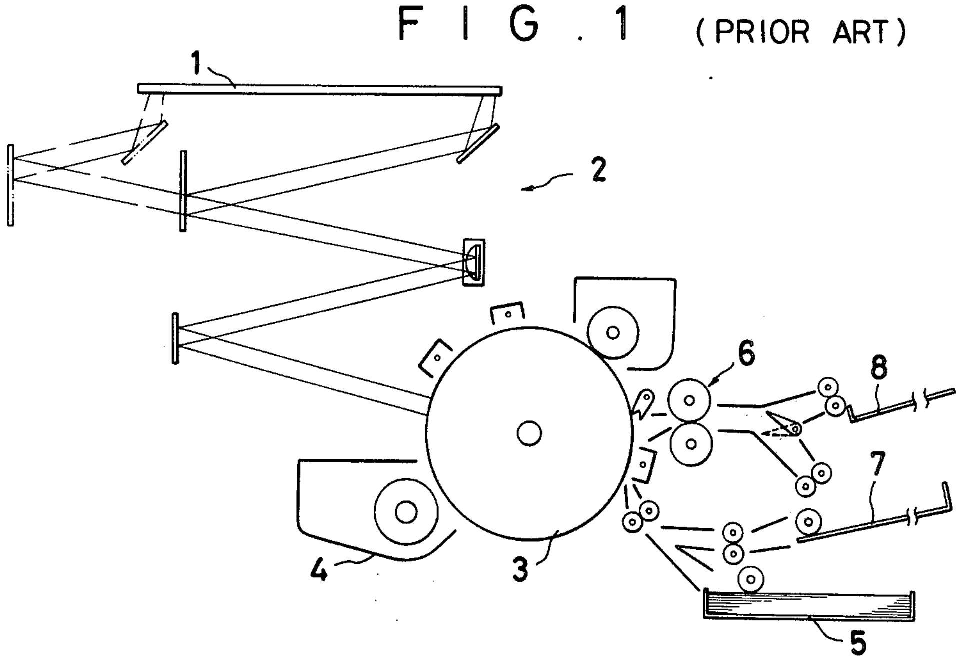
FIG. 1 (PRIOR ART)
FIG. 1 is a schematic sectional side elevation of a prior art duplex copying machine.
Figure 2:
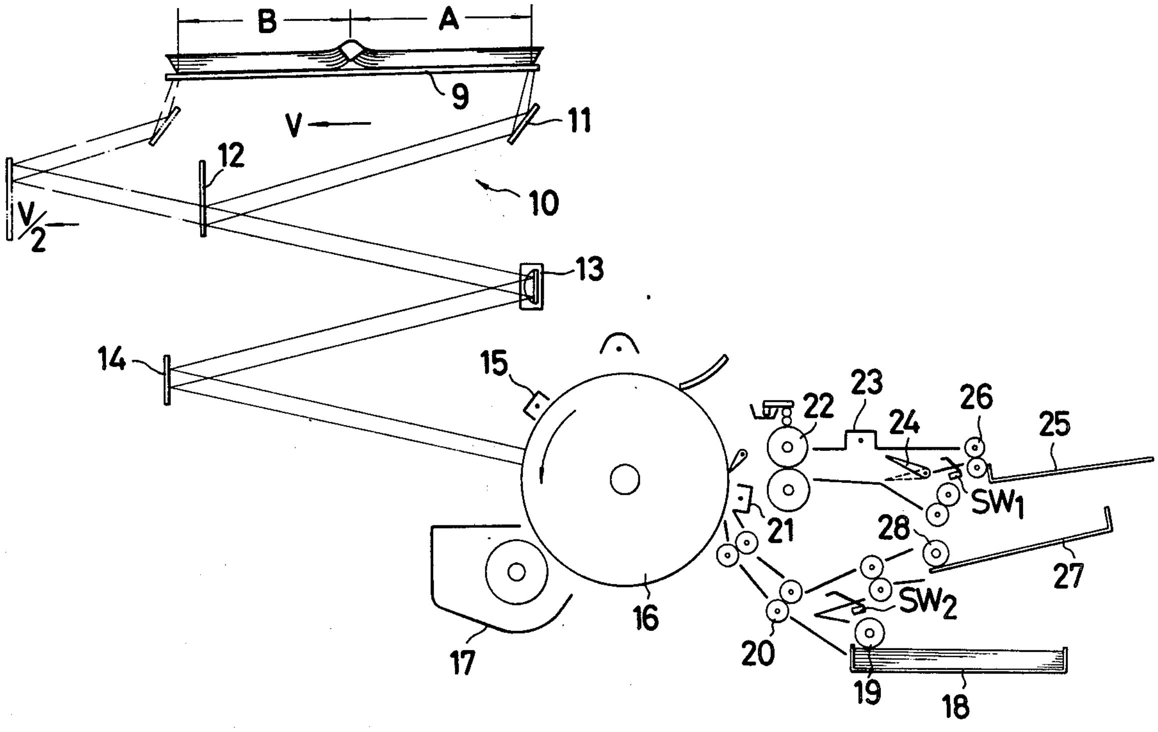
FIG. 2 is a schematic sectional side elevation of a duplex copying machine and an embodiment of a method of duplex copying according to the present invention by use of the duplex copying machine.

FIG. 2 is a schematic sectional side elevation of a duplex copying machine that can be utilized in a duplex copying method according to the present invention. In the figure, reference numeral 9 designates a contact glass for placing an original document thereon, and reference numeral 10 represents an optical exposure system. The optical exposure system 10 comprises a first reflector 11 and a second reflector 12 which, respectively, move in the same direction parallel to the contact glass 9 with a speed ratio of $1:\frac{1}{2}$, a stationary in-mirror lens 13 and a third reflector 14. Just for a convenience of illustrating the invention, a book is placed on the contact glass 9 in such a manner that its even page comes to a right half portion A (hereafter called side A) of the contact glass 9 and its odd page to a left half portion B (hereafter called side B) of the contact glass 9.

Figure 3:
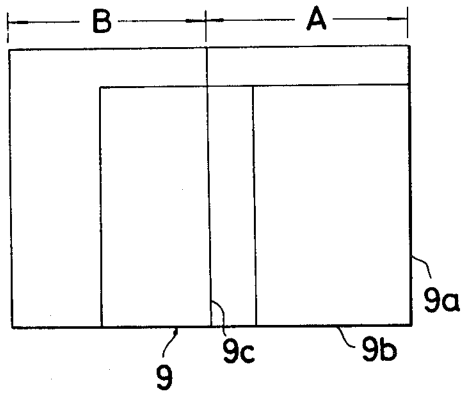
FIG. 3 illustrates how to place originals to be copied on a contact glass in the embodiment of a duplex copying method according to the present invention.
Figure 4:
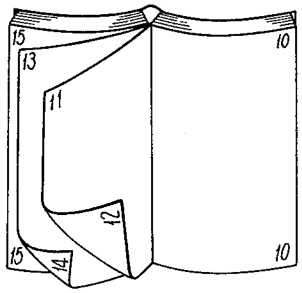
FIG. 4 illustrates an example of bound material to be copied according to the present invention.

FIG. 3 is a schematic plan view of the contact glass 9 of FIG. 2 and illustrates how to place originals to be copied thereon according to the present invention. As mentioned above, the book is placed on the contact glass 9 in such a manner that an even page, for instance, page 10 falls on side A, and an odd page, for instance page 11, on side B as illustrated in FIG. 4.

In the case where a book to be copied is of A4 size (210×297 mm), the whole surface of the contact glass 9 is used in the present duplex copying machine, and in the case where a book to be copied is of B5 size (182×257 mm), the book is placed so that the two sides thereof coincide in position with an exposure starting line *9a* and a lateral end line *9b* of the contact glass 9 as illustrated in FIG. 3. It must be noted here that the transfer sheets have to be of the same size as the originals to be copied.

Alternatively, a book can be copied on the contact glass 9 by use of a center line *9c* of the contact glass 9 as a reference line.

In the following example of a duplex copying method according to the present invention, an A4 size book is placed on the contact glass 9 for making duplex copies from pages 10 to 15 of the book.

First, an input of a program commanding a duplex copying from an A4 size book is applied to a control apparatus of a duplex copying machine for use with the present invention. In accordance with such an input signal received by the control apparatus, each copy element of the duplex copying apparatus is set from a one-side copy mode to a duplex copy mode by conventional techniques, and after a predetermined period of time, a display lamp is lighted, which indicates that the duplex copying machine is ready for such duplex copying.

A book to be copied is then placed in a predetermined position on the contact glass 9 and a duplex copying is started by closing a print switch, whereby an exposure lamp (not shown) comes on.

The first reflector 11 and the second reflector 12 are moved in the direction of the respective arrows thereof up to the respective positions indicated by long and two short dash lines, scanning page 10 on side A and page 11 on side B of the contact glass 9 so that the respective images are projected on a unformly charged photoconductive drum 16, thus latent electrostatic images corresponding to the images of pages 10 and 11 are formed on the photoconductive drum 16. The latent electrostatic images are developed by conventional techniques, such as by brush development by a development apparatus 17. After such exposure scanning, the first and second reflectors 11, 12 are returned to their respective original positions.

From a primary transfer sheet feed apparatus 18 for holding a supply of A4 size transfer sheets, two transfer sheets are transported in succession to an image transfer station with a predetermined interval therebetween by a sheet feed roller 19 and a pair of register rollers 20, the rotation of which is controlled by the above-mentioned control apparatus.

Figure 5:
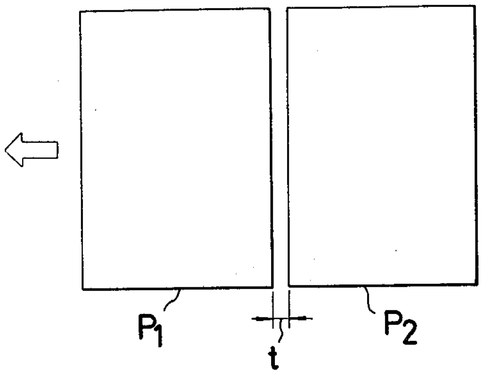
FIG. 5 illustrates how to transport two transfer sheets in succession according to the present invention.

More specifically, referring to FIG. 5, transfer sheets P1, P2 are transported in the direction of an arrow indicated in the figure, with an interval t kept between the transfer sheets P1 and P2. The interval t is adjustable in accordance with the space between the respective originals placed on side A and side B. The interval will be discussed in more detail later.

The thus fed transfer sheets P1 and P2 are transported up to the image transfer station where they are brought into close contact with the photoconductive drum 16 successively and the above-mentioned developed images are electrostatically transferred from the photoconductive drum 16 to the transfer sheets P1 and P2 in succession by an image transfer apparatus 21 comprising an image transfer charger. Thus, an image of page 10 is transferred to the first side of the preceding transfer sheet P1 and that of page 11 to the first side of the succeeding transfer sheet P2. After such image transfer, the respective transfer sheets are fed into a thermal image fixing roller apparatus 22 where toner images on the respective transfer sheets are fixed thereto, and are then transferred to a quenching apparatus 23 where residual charges on the transfer sheets are made null. After this step, the preceding transfer sheet P1 is guided into a transfer sheet output tray 25 by a swingable transfer sheet guide member 24 which is initially switched to a position indicated by dash lines, and is then held between sheet output rollers 26 which are rotated faster than other sheet transfer rollers, and the transfer sheet P1 is discharged to the transfer sheet output tray 25.

Since the sheet output rollers 26 are rotated faster than other sheet transfer rollers, the interval t between the preceding transfer sheet P1 and the succeeding transfer sheet P2 is lengthened, whereby it is made easier to feed the transfer sheet P2 into a secondary sheet feed apparatus 27 by the swingable transfer sheet guide 24.

Namely, immediately after it is detected by a switch SW1 that the leading edge of the transfer sheet P1 has passed through the swingable transfer sheet guide member 24, the swingable guide member 24 is switched to a position indicated by solid lines. Thus, even if the succeeding transfer sheet P2 is transferred with a comparatively short time lag, the switching of the direction of the transfer sheet P2 is easy.

The transfer sheet P2 is placed on the secondary sheet feed apparatus 27 with an image-bearing side (first page) up. At this time, a sheet feed roller 28 for use with the secondary sheet feed apparatus 27 is retracted to an appropriate position so as not to stand in the way of the transfer sheet P2. Alternatively, the secondary sheet feed apparatus 27 can be retracted so as to receive the transfer sheet P2 thereon.

The next page of the book is opened and placed on the contact glass 9 so that page 12 falls on side A and page 13 on side B. Thus, page 12 and page 13 are subjected to exposure scanning, thus latent electrostatic images corresponding to the images of pages 12 and 13 are formed on the photoconductive drum 16.

Meanwhile, the transfer sheet P2 is fed from the secondary sheet feed apparatus 27 by the sheet feed roller 28 and is transported to the image transfer station by the register rollers 20 which are rotated in synchronism with the rotation of the photoconductive drum 16. When the transfer sheet P2 has passed through a switch SW2, a transfer sheet P3 is fed from the primary transfer sheet feed apparatus 18 and is transported to the image transfer station at a predetermined interval t.

After the transfer sheet P2 has passed through the image transfer station 21 and the image fixing station 22, it is discharged to the transfer sheet output tray 25 with the first page down. On the other hand, the transfer sheet P3 is placed on the secondary sheet feed apparatus 27 with the first page up, after having passed through the image transfer station 21 and the image fixing station 22. Hereafter the same copying cycle is repeated.

When an image of page 15 of the book has been formed on the first page of a transfer sheet P4, the image-bearing transfer sheet P4 is directly discharged to the first transfer sheet output tray 25, without being transported into the second sheet feed apparatus 27.

When the above-mentioned copying steps have been finished, the transfer sheets P1 to P4 are stacked on the first transfer sheet output tray 25 in the same order of page as in the original book, each of which bears images in the same image bearing relationship as that of the respective pages of the original book. In other words, page 11 is on the front side of the transfer sheet P2 and page 12 is on the back side of the same, and page 13 and page 14 are on the front side and back side of the transfer sheet P3, respectively.

Referring to FIG. 4, when copying is started with an odd page of the book, the first odd page is placed on side A so that the odd page is copied on a transfer sheet. Alternatively, the first odd page is placed on side B and the sheet feed timing is set so as to feed a second transfer sheet without any preceding transfer sheet.

Figure 6:
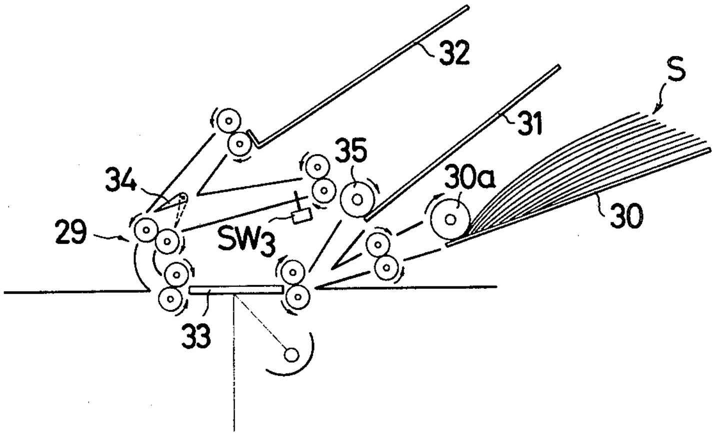
FIG. 6 is a sectional side elevation of an auto document feeder for use in the duplex copying method according to the present invention.

In the case where a duplex copying is made from a sheet original having images on both sides, reference is had to FIG. 6 which is a partial sectional side elevation of a duplex copying machine having an auto document feeder 29.

The auto document feeder 29 comprises a primary sheet original feed apparatus 30, a secondary sheet original feed apparatus 31 and a sheet original output tray 32 and is mounted on an exposure window 33 formed on an upper portion of the duplex copying machine.

Just for convenience of explanation of this duplex copying, it is supposed that two duplex sheet originals S1 and S2, i.e. two originals, each of which has images on both sides, are stacked on the primary sheet original feed apparatus 30 in order of page so that the first page of the originals faces down.

In explaining this duplex copying machine with the auto document feeder, the same reference numerals as in FIG. 2 are used for a photoconductive drum, other apparatuses arranged around the drum, and transfer sheet transport apparatuses.

The duplex originals S1, S2 stacked on the primary sheet original feed apparatus 30 are individually fed from the top original sheet by a sheet original feed roller **30*a*. In other words, the two original sheets are fed in order of S2 and S1 to the exposure window 33, where the original sheets are illuminated in order of page 3 and page 1 of the original sheets. Accordingly, latent electrostatic images are formed on the photoconductive drum 16 in the same order of the original sheets, and two transfer sheets P2, P1 are individually fed from the primary transfer sheet feed apparatus 18** at the same interval as that between the original sheets S1 and S2.

Thus, an image corresponding to that of page 3 of the sheet original S2 is formed on the first page (front page) of the preceding transfer sheet P2 and an image corresponding to that of page 1 of the sheet original S1 is formed on the first page (front page) of the succeeding transfer sheet P1 and the transfer sheets P2 and P1 are stacked on the secondary sheet feed apparatus 27 with the respective image-bearing sides (front pages) up in the order of P2 and P1.

Meanwhile, after illumination at the exposure window 33, the sheet originals S1, S2 are stacked on the secondary sheet original feed apparatus 31 in order of S2, S1 by a swingable sheet original guide member 34, with the respective odd pages up.

In a predetermined period of time after a switch SW3 detects that the two sheet originals have been transported to the secondary sheet original feed apparatus 31, a secondary sheet original feed roller 35 begins to be rotated so that the original sheets stacked on the secondary sheet original feed apparatus 31 are fed again from the top original sheet to the exposure window 33 in order of S1, S2. Thus, the respective latent electrostatic images are formed on the photoconductive drum 16 in order of page 2 and page 4 of the sheet originals.

Meanwhile, the transfer sheets P1, P2 are fed from the secondary sheet feed apparatus 27 in order of P1, P2, and on the second page of the preceding transfer sheet P1 is formed an image corresponding to that of page 2 of the sheet original S1, and on the second page of the succeeding transfer sheet P2 is formed an image corresponding to that of page 4 of the sheet original S2. The transfer sheets S1, S2 are then discharged to the transfer sheet output tray 25 with the respective odd pages down. Thus, they are stacked on the tray 25 in order of page.

The original sheets are also stacked on the sheet original output tray 32 in order of S1, S2 with the respective odd pages down. At this time, the swingable sheet original guide member 34 has been switched to a position indicated by dash lines.

The invention has been described in detail with particular reference to the case where duplex copying is made from two duplex originals, but it will be understood that in the case where duplex copying is made from three or more duplex originals, the same procedure as in the above case applies. Also, duplex copies can be made from originals having images only on one side thereof by the use of the swingable sheet original guide member 34.

Moreover, in the case where a number of copies are made from each original sheet, original sheets stacked on the sheet original output tray 32 in order of page are replaced to the primary sheet original feed apparatus 30 and copying is repeated a desired number of times. Alternatively, a copying cycle passing through the secondary sheet original feed apparatus 31, the exposure window 33, the swingable sheet original guide member 34 and back to the secondary sheet original feed apparatus 31 is repeated a desired number of times, whereby a duplex copying can be attained automatically.

It must be noted here that, if the original sheets are stacked on the primary sheet original feed apparatus 30 with odd pages thereof up, they cannot be stacked on the sheet original output tray 32 in order of page.

Figure 7A:
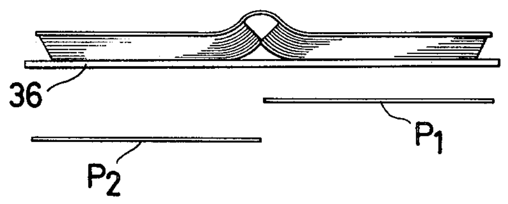
FIGS. 7 (a) and (b) illustrate a transporting method for transfer sheets when duplex copies are made from a bound material according to the present invention.
Figure 7B:
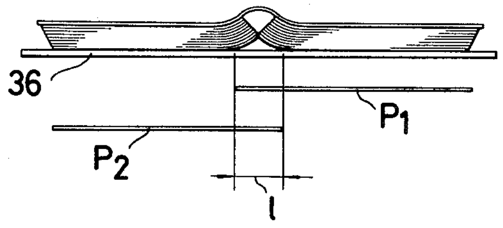

In general, when binding image-bearing transfer sheets in order of page, if there is not a sufficient binding margin in each transfer sheet, a disadvantage occurs that the image areas to be copied are also bound. In such a case, even if no interval is maintained, for example, between the transfer sheets P1 and P2 of FIG. 5 as shown in FIG. 7 (a), sometimes, binding margins thereof are still insufficient. In such case, as shown in FIG. 7 (b), the preceding transfer sheet P1 and the succeeding transfer sheet P2 are transported by overlapping each other by a length l so that a central portion l where no images are copied can be used as a binding margin. Moreover, according to the duplex copying method of the present invention, a binding margin is formed in an identical portion of each transfer sheet regardless of the image-bearing sides, i.e., the front side or back side of each transfer sheet. Thus, image areas are not bound.

Figure 8:
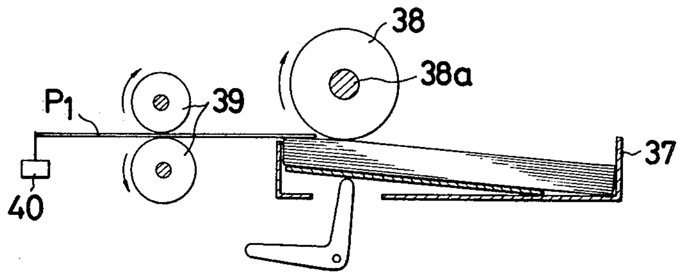
FIG. 8 is a schematic sectional side elevation of a transfer sheet feed apparatus for use in a method of duplex copying according to the present invention.

FIG. 8 shows a transfer sheet feed apparatus for use with the present invention, capable of feeding two transfer sheets at a time, with the two sheets being overlapped partially.

In the figure, reference numeral 37 designates a cassette for holding a supply of transfer sheets. Reference numeral 38 denotes a sheet feed roller. Reference numeral 39 identifies a pair of sheet carriage rollers and reference numeral 40 represents sheet detection means.

The sheet carriage rollers 39 are always rotated at a speed of V and the sheet feed roller 38 has an over-running clutch (not shown) between the sheet feed roller 38 and a shaft **38*a*** thereof.

A transfer sheet P1 fed by the sheet feed roller 38 is held between the sheet carriage rollers 39 and transported at the speed of V. When the transfer sheet P1 has reached the sheet carriage rollers 39, the sheet feed roller 38 is disconnected from a driving force, but it is rotated continuously by the over-running clutch. When the leading edge of the transfer sheet P1 is detected by sheet detection means 40, the sheet feed roller 38 is again driven and rotated.

Therefore, by adjusting the distance between the sheet detecting means 40 and the sheet feed roller 38, the overlapping length of each transfer sheet can be changed appropriately. The overlapping length can be changed easily in accordance with the size of a book to be copied or the size of a transfer sheet, for example, by connecting the sheet detecting means 40 with adjusting means, disposed outside the duplex copying machine, capable of adjusting the above-mentioned distance between the detecting means 40 and the sheet feed roller 38.

Alternatively, the sheet feed roller 38 is continuously rotated during one cycle of copying process without using the sheet detection means 40, so that the transfer sheets are individually transported, overlapping by the length from the front end of the cassette to the point at which the sheet feed roller 38 is in contact with the top sheet in the cassette.

As discussed previously, transfer sheets stacked on the secondary sheet feed apparatus are again transported in the direction of the image transfer station at the next step for duplex copying. In this case, the transfer sheets in the secondary sheet feed apparatus have to be stacked neatly and lined up. Otherwise, copying of the respective back sides of the transfer sheets cannot be performed in a proper position. The same requirement applies to sheet originals stacked on the sheet original feed apparatus.

Figure 9:
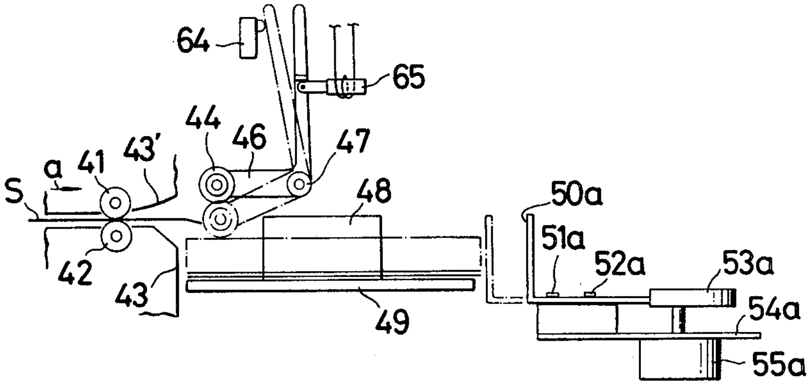
FIG. 9 is a partial schematic sectional side elevation of a sheet feed apparatus capable of stacking sheets neatly and in good order.
Figure 10:
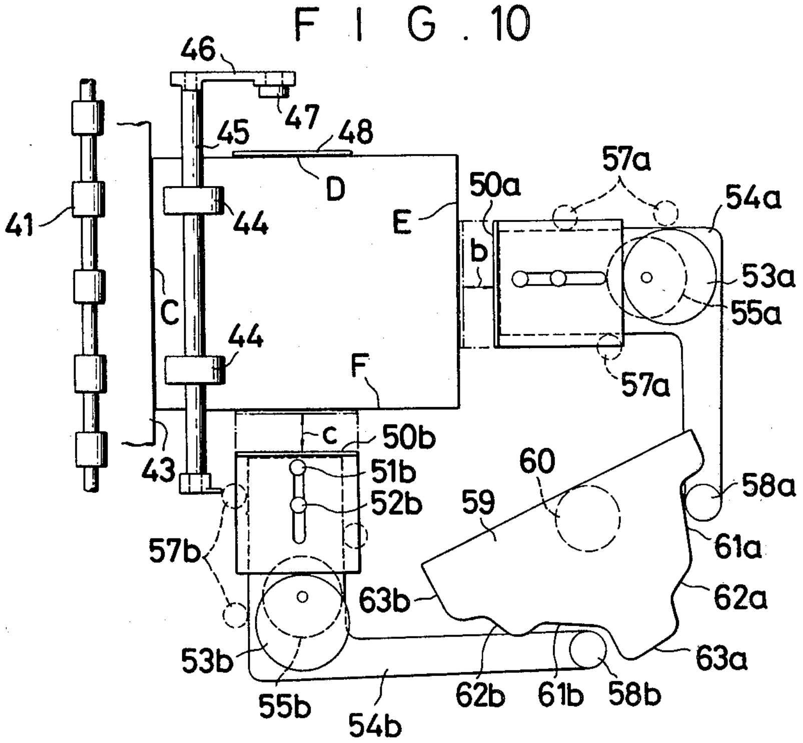
FIG. 10 is a schematic plan view of the sheet feed apparatus of FIG. 9.

FIGS. 9 and 10 show a sheet feed apparatus capable of stacking sheets neatly and in good order, which can be utilized as the secondary sheet feed apparatus and the sheet original feed apparatus.

In the figures, reference numerals 41, 42 represent a pair of delivery rollers. A transfer sheet S is held between the delivery rollers and delivered in the direction of an arrow a.

Reference numeral 49 identifies a base to place the transfer sheet S thereon. The base 49 is movable up and down by a driving mechanism (not shown). Reference numeral **50*a* designates an end plate disposed parallel to a front plate 43. The end plate 50*a* is supported by pins 51*a*, 52*a* so as to be slidable on a movable base 54*a*** only in the directions of an arrow b.

Reference numeral **55*a* represents a motor which drives a cam 53*a*. The motor 55*a* is fixed to the movable base 54*a*. The cam 53*a* reciprocates the end plate 50*a* in the directions of the arrow b. The movable base 54*a* is movable on a frame (not shown) in the directions of the arrow b, guided by pins 57*a*. However, the movable base 54*a* is driven by a cam 59 and its position is also determined by the cam 59**.

The cam 59 has step-shaped edges **61*a*, 62*a*, 63*a*, 61*b*, 62*b*, and 63*b* and can be rotated to three angular positions by a knob 60**.

A roller **58*a* disposed on the movable base 54*a* is brought into contact with one of the cam edges 61*a*, 62*a* and 63*a*, whereby the position of the movable base 54*a*** is determined.

The front plate 43 is for use in determining a reference position of one edge C of the transfer sheet S. A reference position of another edge D adjacent the edge C is determined by a side reference plate 48. The side reference plate 48 is fixed to the frame so as to be normal to the front plate 43. A movable side plate **50*b* is disposed so as to face and to be parallel to the side reference plate 48. The movable side plate 50*b* is also movable in the directions of an arrow c by a mechanism similar to that of the end plate 50*a***.

Reference numeral 44 represents discharging rollers which are rotated by a shaft 45 supported at one end of an L-shaped lever 46. The lever 46 rotates on a shaft 47.

The lever 46 is turned to a position indicated by solid lines by a solenoid 65.

Reference numeral 64 identifies a microswitch which detects the position of the turned lever 46 and which is actuated when pressed by the lever 46.

The illustrated sheet feed apparatus is operated as follows. The transfer sheet S having had an image on one side thereof is delivered by the rotation of the delivery rollers 41, 42 until it is brought into contact with the end plate 50*a* which is in a retracted position, so that it falls on the base 49. At this moment, since the magnetic plunger 65 is energized, the discharging rollers 44 are in an upper position indicated by solid lines so that the rollers 44 are not in the way of the transfer sheet S.

When the transfer sheet S has fallen on the base 49, the motors 55*a*, 55*b* are energized so that the cams 53*a*, 53*b* are rotated one time, respectively.

As a result, the end plate 50*a* and the movable side plate 50*b* are reciprocated one time in the respective directions of the arrow b and the arrow c.

By this movement of the end plate 50*a*, the edge C of the transfer sheet S is brought into contact with the front plate 43, and by the movement of the movable side plate 50*b*, the edge D of the transfer sheet S is brought into contact with the side reference plate 48. Thus, the transfer sheet S is placed in a predetermined reference position.

In the same manner, transfer sheets S having had images on one side thereof, which are delivered in succession by the delivery rollers 41, 42, are stacked on the base 49, with their respective edges C, D neatly lined up. Thus, a space surrounded by the base 49, the front plate 43, the side reference plate 48, end plate 50*a* and the movable side plate 50*b* is used as a tray for holding transfer sheets S having had images on one side thereof.

When one-side copying of a certain set of transfer sheets has been finished, since the magnetic plunger 65 is disconnected from a power source, the lever 46 is turned to a position indicated by long and short dash lines, and the discharging rollers 44 are moved downwards. At the same time, the microswitch 64 is pressed and turned on. With the microswitch 64 on, the base 49 is moved upwards by a driving mechanism (not shown). Accordingly, a stack of transfer sheets S on the base 49 is also moved upwards. As a result, the discharging rollers 44 are pressed upwards by the stack of transfer sheets S, and the lever 46 is turned slightly in the direction of a position indicated by solid lines so that the lever 46 is disengaged from the microswitch 64. Thus, the microswitch 64 is turned off and the upward movement of the base 49 is terminated. At this stage, the top layer of the stack of transfer sheets S is located in a reference position indicated by long and dash line.

Thus, when the rotation of the discharging rollers 44 is started, since the rotating direction of the delivery rollers 41, 42 has been switched in the reverse direction, the transfer sheets are individually discharged in the direction opposite to that of the arrow a for duplex copying.

There is no particular restriction with respect to the operational timing of the end plate 50*a* and the movable side plate 50*b*. However, it is preferable that they are moved at the same time. For an accurate discharging of transfer sheets, it is also preferable that the end plate 50*a* and the movable side plate 50*b* are in contact with the edges E and F of the transfer sheets, respectively, when they are discharged.

When the sheet size is changed, the cam 59 is rotated to a proper position by turning the knob 60, whereby the movable bases 54*a*, 54*b* are moved to a suitable position, respectively, for a sheet size to be set, and the end plate 50*a* and the movable side plate 50*b* are reciprocated in the respective directions of the arrow b and the arrow c from the respective reference positions thereof.

By disposing the base 49 and the front plate 43 slantingly, the edge C of the transfer sheets S comes in contact with the front plate 43 under the weight of the transfer sheets S. In this case, the end plate 50*a* can be disposed fixedly.

What is claimed is:

1. A method of duplex copying using an electrophotographic duplex copying machine, capable of forming images on both sides of a transfer sheet, and of the type including a contact glass, exposure means, a photoconductive member with an image transfer station, a primary sheet feed means, a secondary sheet feed means and a sheet output means: said method comprising the steps of placing two originals side-by-side on the contact glass and aligned in the scanning direction; successively scanning the two originals with the exposure means to form, with a single operating cycle of the exposure means, two successive images on the photoconductive member each corresponding to a respective original; upon initiating duplex copying, successively feeding, from the primary sheet feed means to the image transfer station, with an interval therebetween, two transfer sheets and, during succeeding duplex copying, successively feeding, to the image transfer station and with an interval therebetween, two transfer sheets, one from the secondary sheet feed means containing transfer sheets which have already had an image transferred to one side thereof from the photoconductive member, and the other from the primary sheet feed means; transferring the respective developed images corresponding to the two originals from the photoconductive member separately to each two transfer sheets; and discharging a preceding transfer sheet of each two transfer sheets to the sheet output means while stacking the suceeding transfer sheet of each two transfer sheets in the secondary sheet feed means by utilizing a transfer sheet guide member which selectively guides transfer sheets into the secondary sheet feed means or into the sheet output means.

2. A method of duplex copying according to claim 1, further comprising the step of successively feeding, from the primary sheet feed means to the image transfer station, two transfer sheets each having a portion overlapping the other for defining a binding margin on each transfer sheet.

3. A method of duplex copying according to claim 1, further comprising successively feeding, to the image transfer station, one of the two transfer sheets from the secondary sheet feed means and one of the two transfer sheets from the primary sheet feed means toward each other to successively receive an image from the image transfer station, and then successively feeding said one transfer sheet from the secondary sheet feed means and said one transfer sheet from the primary sheet feed means to reverse each transfer sheet once during transportation thereof.

4. A method of duplex copying according to claim 1, further comprising the steps of detecting the passing of one of the transfer sheets during said successive feeding, and separating a succeeding transfer sheet from the path of the detected transfer sheet with the detection of the detected transfer sheet.

5. A method of duplex copying using an electrophotographic duplex copying machine, capable of forming images on both sides of a transfer sheet, and of the type including a photoconductive member with an image transfer station, a primary transfer sheet feed means, a secondary transfer sheet feed means, a transfer sheet output means, exposure means, a slit exposure station, and an auto document feeder mounted on the slit exposure station and including a primary sheet original feed means, a secondary sheet original feed means, a sheet original output means, sheet original transport means, and a swingable sheet original guide member for selectively guiding sheet originals individually into either the secondary sheet original feed means or into the sheet original output means, and capable of feeding two sheet originals in succession at one time and of reversing each sheet original once during transportation thereof from the primary sheet original feed means to the secondary sheet original feed means or to the sheet original output means; said method comprising the steps of successively feeding two sheet originals, having images on both sides thereof, from a stack of duplex sheet originals placed in order of page number on the primary sheet original feed means, with a predetermined interval therebetween, to the slit exposure station and starting with the next sheet original; forming successive latent electrostatic images, corresponding to the respective images of the two sheet originals, on the photoconductive member while the two sheet originals are transported through the slit exposure station; after the two originals have passed through the slit exposure station, stacking the two originals on the secondary sheet original feed means; successively feeding, from the primary transfer sheet feed means to the image transfer station, with a predetermined interval therebetween, two transfer sheets; transferring the respective developed images, corresponding to the two sheet originals, from the photoconductive member separately to the two transfer sheets fed from the primary transfer sheet feed means; stacking the two transfer sheets, each now having an image on one side thereof, on the secondary transfer sheet feed means after once reversing each such transfer sheet; feeding the two sheet originals, stacked on the secondary sheet original feed means, and with a predetermined interval therebetween, to the slit exposure station starting with the now next sheet original; after formation of successive latent electrostatic images, corresponding to the respective images of the two sheet originals fed from the secondary sheet original feed means, on the photoconductive member and development of the latent images, feeding the two transfer sheets, having images on one side thereof and stacked on the secondary transfer sheet feed means, with a predetermined interval therebetween, to the image transfer station and starting with the now next transfer sheet; transferring the respective developed images, corresponding to the two sheet originals, from the photoconductive member separately to the two transfer sheets fed from the secondary transfer sheet feed means; and discharging the two transfer sheets, now having images on both sides thereof to the transfer sheet output means.

6. A method of duplex copying using an electrophotographic duplex copying machine of the type including a photoconductive member with an image transfer station, a primary transfer sheet feed means, a secondary transfer sheet feed means, a transfer sheet output means, exposure means, a slit exposure station, and an auto document feeder mounted on the slit exposure station and including sheet original feed means, sheet original output means, and sheet original transport means, and capable of feeding two sheet originals in successive at one time; said method comprising the steps of successively feeding two sheet originals, having images on one side thereof, from a stack of sheet originals placed in order of page number on the sheet original feed means, with a predetermined interval therebetween, to the slit exposure station and starting with the next sheet original; forming successive latent electrostatic images, corresponding to the respective images of the two sheet originals, on the photoconductive member while the two sheet originals are transported through the slit exposure station; after the two originals have passed through the slit exposure station, stacking the two originals on the sheet original output means; successively feeding, from the primary transfer sheet feed means to the image transfer station, with a predetermined interval therebetween two transfer sheets; transferring the respective developed images, corresponding to the two sheet originals, from the photoconductive member separately to the two transfer sheets fed from the primary transfer sheet feed means; stacking the two transfer sheets, each now having an image on one side thereof, on the secondary transfer sheet feed means after once reversing each such transfer sheet; feeding the two transfer sheets, having images on one side thereof and stacked on the secondary transfer sheet feed means, with a predetermined interval therebetween, to the image transfer station and starting with the now next transfer sheet; transferring the respective developed images, corresponding to the two sheet originals, from the photoconductive member separately to the two transfer sheets fed from the secondary sheet feed means; and discharging the two transfer sheets, now having images on both sides thereof, to the transfer sheet output means.

7. A duplex copying apparatus in which a toner image is transferred to a first and second side of a transfer sheet comprising: primary sheet feed means to feed the transfer sheet to a photoconductive drum and transfer a toner image on one side thereof, second sheet feed means to which the transfer sheet is then fed and from which the transfer sheet is fed to said photoconductive drum where another toner image is transferred to a second side of the transfer sheet and the transfer sheet is discharged to a sheet outlet tray, said second sheet feed means comprising, in combination, a base for stacking transfer sheets thereon; a front plate and a side reference plate adjacent said base and fixedly disposed normal to each other; and at least one movable plate disposed parallel to one of said front plate and said side reference plate and operable to bring transfer sheets into contact with both said front plate and said side reference plate so that the transfer sheets, in a stack, are lined up evenly.

8. A sheet feed apparatus, as claimed in claim 7, including two said movable plates one disposed parallel to said front plate and the other disposed parallel to said side reference plate.

* * * * *